(12) United States Patent
Shimizu

(10) Patent No.: US 10,410,514 B2
(45) Date of Patent: Sep. 10, 2019

(54) DISPLAY DEVICE FOR VEHICLE AND DISPLAY METHOD FOR VEHICLE

(71) Applicant: JVC KENWOOD Corporation, Yokohama-shi, Kanagawa (JP)

(72) Inventor: Yoshiyuki Shimizu, Yokohama (JP)

(73) Assignee: JVCKENWOOD Corporation, Yokohama-shi, Kanagawa (JP)

( * ) Notice: Subject to any disclaimer, the term of this patent is extended or adjusted under 35 U.S.C. 154(b) by 37 days.

(21) Appl. No.: 15/915,296

(22) Filed: Mar. 8, 2018

(65) Prior Publication Data

US 2018/0197411 A1 Jul. 12, 2018

Related U.S. Application Data

(63) Continuation of application No. PCT/JP2016/002550, filed on May 26, 2016.

(30) Foreign Application Priority Data

Sep. 8, 2015 (JP) ................................ 2015-176718
Apr. 1, 2016 (JP) ................................ 2016-074015

(51) Int. Cl.
*G08G 1/0962* (2006.01)
*B60R 1/00* (2006.01)
(Continued)

(52) U.S. Cl.
CPC ........... *G08G 1/09626* (2013.01); *B60R 1/00* (2013.01); *G06K 9/00791* (2013.01);
(Continued)

(58) Field of Classification Search
CPC ............. G08G 1/09626; G08G 1/0112; G06K 9/00791; G06K 9/00825; G06K 2209/23;
(Continued)

(56) References Cited

U.S. PATENT DOCUMENTS

2002/0069010 A1 6/2002 Nishira et al.
2008/0319601 A1* 12/2008 Komeda ............... B60W 40/10
701/99

(Continued)

FOREIGN PATENT DOCUMENTS

| JP | 2010-186345 A | 8/2010 |
| JP | 2014-196022 A | 10/2014 |
| WO | 2013/093603 A1 | 6/2013 |

*Primary Examiner* — Ke Xiao
*Assistant Examiner* — Kim Thanh T Tran
(74) *Attorney, Agent, or Firm* — Procopio, Cory, Hargreaves & Savitch LLP

(57) ABSTRACT

A display controller is able to selectively perform a rearward normal display mode in which a first view-angle image is displayed in the display unit as an image of a first area of the rearward image and a rearward enlarged display mode in which a second view-angle image is displayed in the display unit as an image of a second area of the rearward image smaller than the first view-angle image in an enlarged manner. The display controller performs the rearward enlarged display mode when: an upward slope of a road on which an own car is traveling has increased; a vehicle speed of the own car has decreased after the upward slope of the road has increased; there is no preceding car that is closely lined up with the own car; and there is a following car that is not closely lined up with the own car.

10 Claims, 15 Drawing Sheets

(51) Int. Cl.
*G06K 9/00* (2006.01)
*G08G 1/01* (2006.01)

(52) U.S. Cl.
CPC ....... *G06K 9/00825* (2013.01); *G08G 1/0112* (2013.01); *B60R 2300/301* (2013.01); *B60R 2300/302* (2013.01); *B60R 2300/306* (2013.01); *B60R 2300/8046* (2013.01); *B60R 2300/8066* (2013.01); *B60W 2550/142* (2013.01); *G06K 2209/23* (2013.01)

(58) Field of Classification Search
CPC .............. B60R 1/00; B60R 2300/8066; B60R 2300/301; B60R 2300/302; B60R 2300/8046; B60R 2300/306; B60W 2550/142
USPC ......................................................... 345/632
See application file for complete search history.

(56) References Cited

U.S. PATENT DOCUMENTS

| | | | | |
|---|---|---|---|---|
| 2011/0243379 A1* | 10/2011 | Miyajima | .......... | G01C 21/3647 382/103 |
| 2015/0022665 A1* | 1/2015 | Lu | .............................. | B60R 1/00 348/148 |
| 2016/0203629 A1* | 7/2016 | Takeda | ...................... | B60R 1/00 345/632 |
| 2017/0368993 A1* | 12/2017 | Imura | ...................... | B60R 1/00 |

\* cited by examiner

US 10,410,514 B2

DISPLAY DEVICE FOR VEHICLE AND DISPLAY METHOD FOR VEHICLE

CROSS REFERENCE TO RELATED APPLICATION

This application is based upon and claims the benefit of priority from Japanese patent application No. 2015-176718, filed on Sep. 8, 2015, and Japanese patent application No. 2016-074015, filed on Apr. 1, 2016, the disclosure of which are incorporated herein in its entirety by reference.

BACKGROUND

The present disclosure relates to a display device for a vehicle and a display method for a vehicle.

On an expressway, traffic congestion often occurs at a place where an upward slope starts. This is because when an upward slope starts, vehicle speeds decrease. Therefore, cars following those with decreased speeds are forced to reduce their speeds in a chain reaction.

As a type of technique for solving this problem, Patent Literature 1 (Japanese Unexamined Patent Application Publication No. 2010-186345) discloses a vehicle information transmission system that determines whether or not there is traffic congestion information based on navigation information such as speed information of vehicles located ahead and reports, before a traveling vehicle gets caught in traffic congestion, the congestion information to a user of the vehicle.

SUMMARY

Incidentally, there are cases in which a driver does not notice that the vehicle speed has decreased due to an increase in an upward slope and hence his/her car becomes a cause of congestion. Most of these cases are caused because drivers do not appropriately check speedometers and take notice of positional relations between their vehicles and vehicles located ahead of or behind them. In such a situation, if a warning is displayed or an alarm is generated, the driver cannot instantaneously find out the cause thereof and reduces the vehicle speed even further as a sudden reaction. Further, there are cases in which a driver notices that a following car has come closer to his/her car because the size of the following car reflected in an inner rearview mirror or displayed in a back monitor has increased. However, in most cases, the car has already become a cause of congestion in the above situation.

In the configuration disclosed in the above-described Patent Literature 1, although the vehicle information transmission system issues a warning about already-occurred congestion, it does not have any function for vehicles that could become a cause of congestion and hence does not prevent the occurrence of congestion.

In order to solve the above-mentioned problem, a first aspect of an embodiment is a vehicle-use display device including: a road slope information acquisition unit configured to acquire slope information of a road on which an own car is traveling; a vehicle speed acquisition unit configured to acquire a vehicle speed of the own car; an other-car detector configured to detect a car preceding the own car and a car following the own car; an image pickup unit configured to take an image of view to rear of the own car; a display unit; and a display controller configured to display a rearward image taken by the image pickup unit in the display unit; in which the display controller is able to selectively perform a rearward normal display mode and a rearward enlarged display mode, the rearward normal display mode being a mode in which an image of a first area in the rearward image is displayed in the display unit, the rearward enlarged display mode being a mode in which an image of a second area in the rearward image smaller than the first area is displayed in the displayed unit in an enlarged manner, and the display controller performs the rearward enlarged display mode when: it is detected that the vehicle speed of the own car has decreased after the upward slope of the road on which the own car is traveling has increased; there is no preceding car that is closely lined up with the own car based on a result of detection by the other-car detector; and there is the following car that is not closely lined up with the own car.

A second aspect of an embodiment is a display method for a vehicle for selectively performing a rearward normal display mode and a rearward enlarged display mode, the rearward normal display mode being a mode in which an image of a first area in a rearward image obtained by taking an image of view to rear of an own car is displayed in the display unit, the rearward enlarged display mode being a mode in which an image of a second area in the rearward image smaller than the first area is displayed in the displayed unit in an enlarged manner, in which the rearward enlarged display mode is performed when: an upward slope of a road on which the own car is traveling has increased; a decrease in a vehicle speed of the own car is detected after the upward slope of the road has increased; there is no preceding car that is closely lined up with the own car; and there is a following car that is not closely lined up with the own car.

DETAILED DESCRIPTION

First Embodiment

Figure 1:
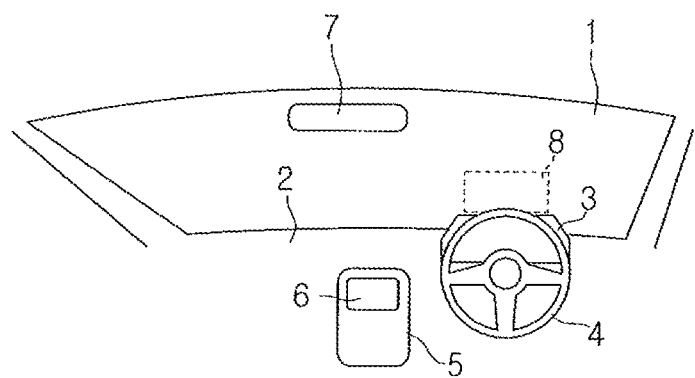
FIG. 1 schematically shows an example of a front of a driver seat inside a vehicle (first embodiment)

A first embodiment is explained hereinafter with reference to FIGS. 1 to 6. FIG. 1 schematically shows an example of a front of a driver seat inside a vehicle. As shown in FIG. 1, a windshield 1, a dashboard 2, a cluster panel 3, a steering wheel 4, a center console panel 5, a navigation display 6, an inner rearview mirror with a display function 7, and a head-up display 8 are disposed in front of the driver seat. The head-up display 8 shown in FIG. 1 does not indicate a main body thereof, but indicates a range in which a virtual image is projected.

At least one of the cluster panel 3, the navigation display 6, the inner rearview mirror with the display function 7, and the head-up display 8 functions as a display unit. In this embodiment, the inner rearview mirror with the display function 7 functions as a display unit.

Figure 2:
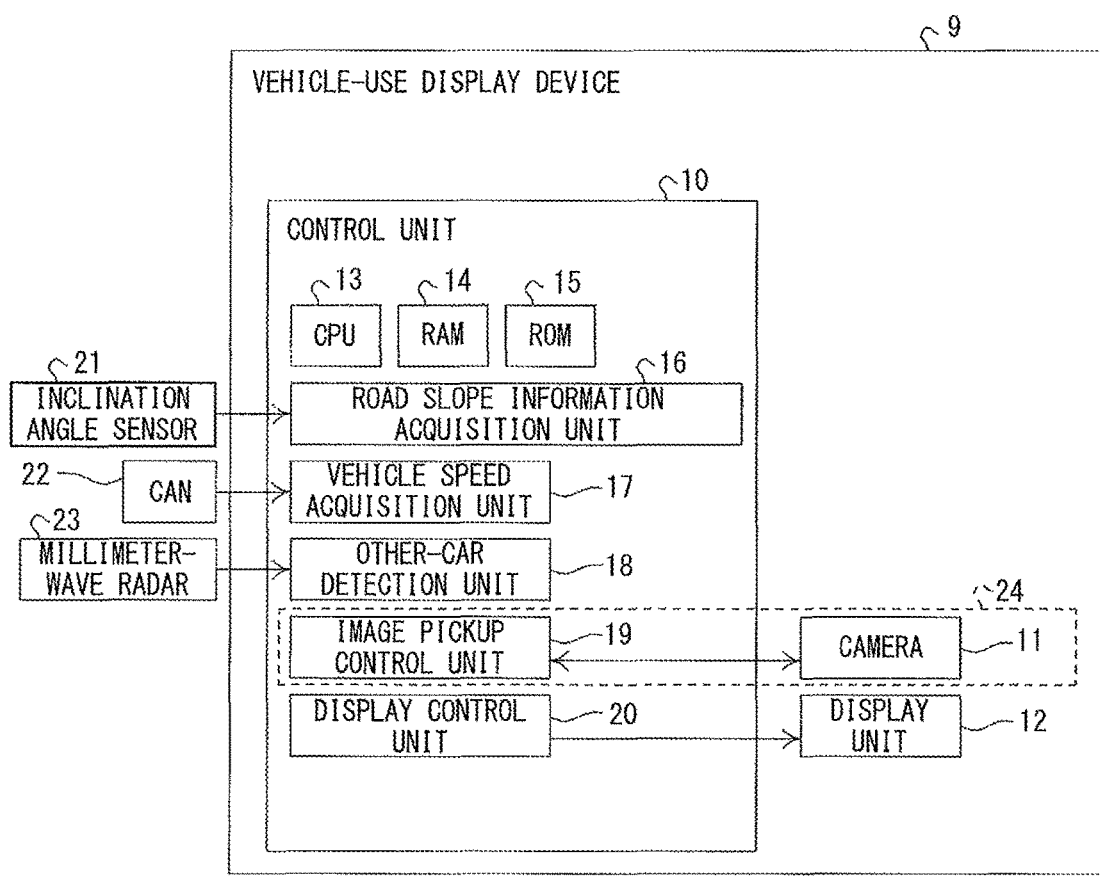
FIG. 2 is a functional block diagram of a vehicle-use display device (first embodiment)

FIG. 2 is a functional block diagram of a vehicle-use display device 9. As shown in FIG. 2, the vehicle-use display device 9 includes a controller 10, a camera 11, and a display unit 12.

The camera 11 generates image data by taking an image of the view to the rear of an own car and outputs the generated image data to the controller 10.

In this embodiment, the display unit 12 corresponds to the inner rearview mirror with the display function 7.

The controller 10 includes a CPU (Central Processing Unit) 13 that serves as a central processing unit, a readable/writable RAM (Random Access Memory) 14, and a read-only ROM (Read Only Memory) 15. Further, by having the CPU 13 load and execute a display program for a vehicle stored in the ROM 15, the display program for a vehicle causes hardware such as the CPU 13 to function as a road slope information acquisition unit 16, a vehicle speed acquisition unit 17, an other-car detector 18, an image pickup controller 19, and a display controller 20.

The road slope information acquisition unit 16 acquires, for example, road slope information of a road on which the own car is traveling based on an output value of an inclination angle sensor 21 disposed in the vehicle. Instead of acquiring the road slope information by using the output value of the inclination angle sensor 21, the road slope information acquisition unit 16 may acquire the road slope information by using map information or route information that is stored in a navigation system in advance, or map information or route information received through radio communication such as a WAN (Wide Area Network).

Further, as another example of the road slope information acquisition unit 16, the camera 11, which constitutes an image pickup unit 24, may be equipped with a camera that takes an image of the view to the front of the vehicle. Then, the road slope information acquisition unit 16 may acquire slope information by recognizing a sign indicating inclination information by performing an image recognition process on the forward image obtained by taking the image of the view to the front of the vehicle.

The vehicle speed acquisition unit 17 acquires, for example, a vehicle speed of the own car through a CAN (Controller Area Network) 22. Instead of acquiring the vehicle speed of the own car through the CAN 22, the vehicle speed acquisition unit 17 may acquire the vehicle speed of the own car by using position information received through a GPS (Global Positioning System).

The other-car detector 18 detects a distance between the own car and a preceding car, and a distance between the own cat and a following car by using, for example, a millimeter-wave radar 23. In the case of using the millimeter-wave radar 23, it is possible to detect a preceding car that is up to 150 m away from the own car. Similarly, in the case of using the millimeter-wave radar 23, it is possible to detect a following car that is up to 150 m away from the own car. Therefore, the other-car detector 18 detects whether or not there is a preceding car within a range of 150 m ahead of the current position of the own car. Similarly, the other-car detector 18 detects whether or not there is a following car within a range of 150 m behind the current position of the own car. Instead of detecting a preceding car and a following car by using the millimeter-wave radar 23, the other-car detector 18 may detect a preceding car and a following car by, for example, performing an image analysis on image data generated by a camera that takes images of the view to the front and the view to the rear of the own car.

Figure 3:
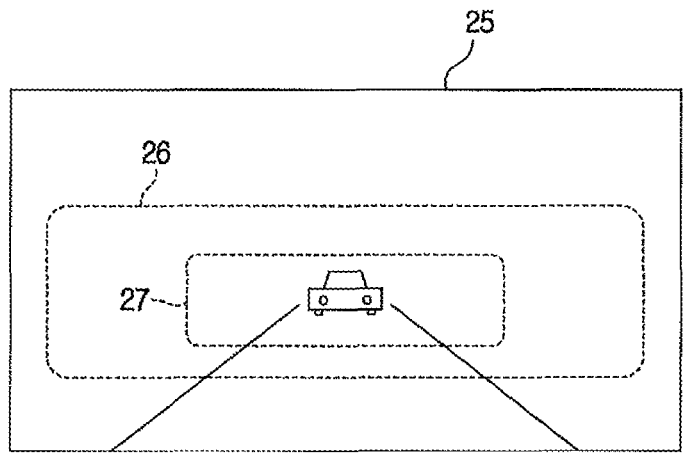
FIG. 3 schematically shows an example of a rearward image (first embodiment)

The image pickup controller 19 controls photographing performed by the camera 11. In this embodiment, the camera 11 and the image pickup controller 19 constitute the image pickup unit 24 that takes an image of the view to the rear of the own car. That is, the image pickup unit 24 takes an image of the view to the rear of the own car. FIG. 3 shows an example of a rearward image 25 taken by the image pickup unit 24. Each of a first view-angle image 26 and a second view-angle image 27 shown in FIG. 3 is cut out in a cut-out shape conforming to the shape of a display surface on which the image is displayed. Further, they are also cut-out ranges corresponding to a rearward normal display mode and a rearward enlarged display mode, which will be described later.

Figure 4:
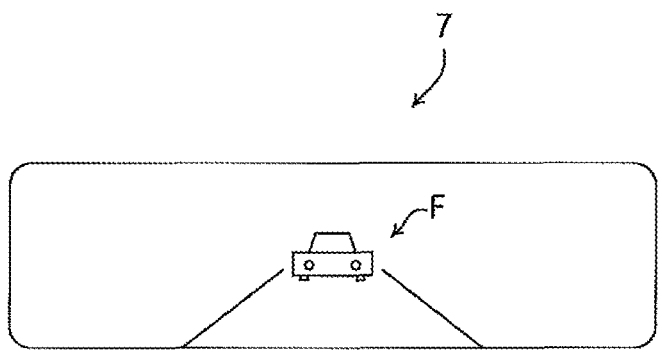
FIG. 4 schematically shows an example of an image displayed in an inner rearview mirror with a display function (first embodiment)
Figure 5:
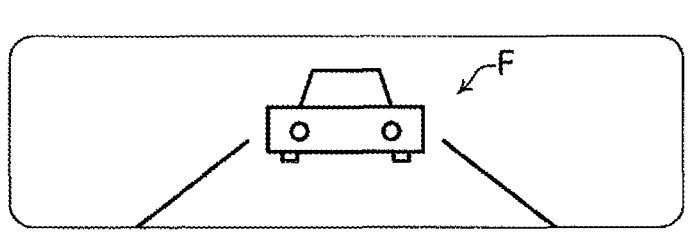
FIG. 5 schematically shows an example of an image displayed in an inner rearview mirror with a display function (first embodiment)

The display controller 20 displays the rearward image 25 taken by the image pickup unit 24 in the display unit 12. Specifically, the display controller 20 is able to selectively perform the rearward normal display mode and the rearward enlarged display mode. As shown in FIG. 4, the rearward normal display mode is a mode in which the first view-angle image 26 in the rearward image 25 is displayed as an image of a first area in the display unit 12 (in the inner rearview mirror with the display function 7 in this embodiment). The first view-angle image 26, which is displayed in the rearward normal display mode, is set in such a manner that its angle of view is substantially the same as that of a rearward image a driver views in an ordinary inner rearview mirror using an actual mirror. Further, it is also an angle of view by which a driver can appropriately recognize a distance between the own car and a following car F. As shown in FIG. 5, the rearward enlarged display mode is a mode in which the second view-angle image 27 in the rearward image 25 is displayed as an image of a second area in the display unit 12 (in the inner rearview mirror with the display function 7 in this embodiment) in an enlarged manner. The second area is an area located inside the first area and smaller than the first area. That is, the second view-angle image 27 is an image in an area located inside the first view-angle image 26 and has a range smaller than that of the first view-angle image 26. Therefore, the image of the following car F reflected in the inner rearview mirror with the display function 7 in the rearward normal display mode shown in FIG. 4 is larger than that of the following car F reflected in the inner rearview mirror with the display function 7 in the rearward enlarged display mode shown in FIG. 5.

Figure 6:
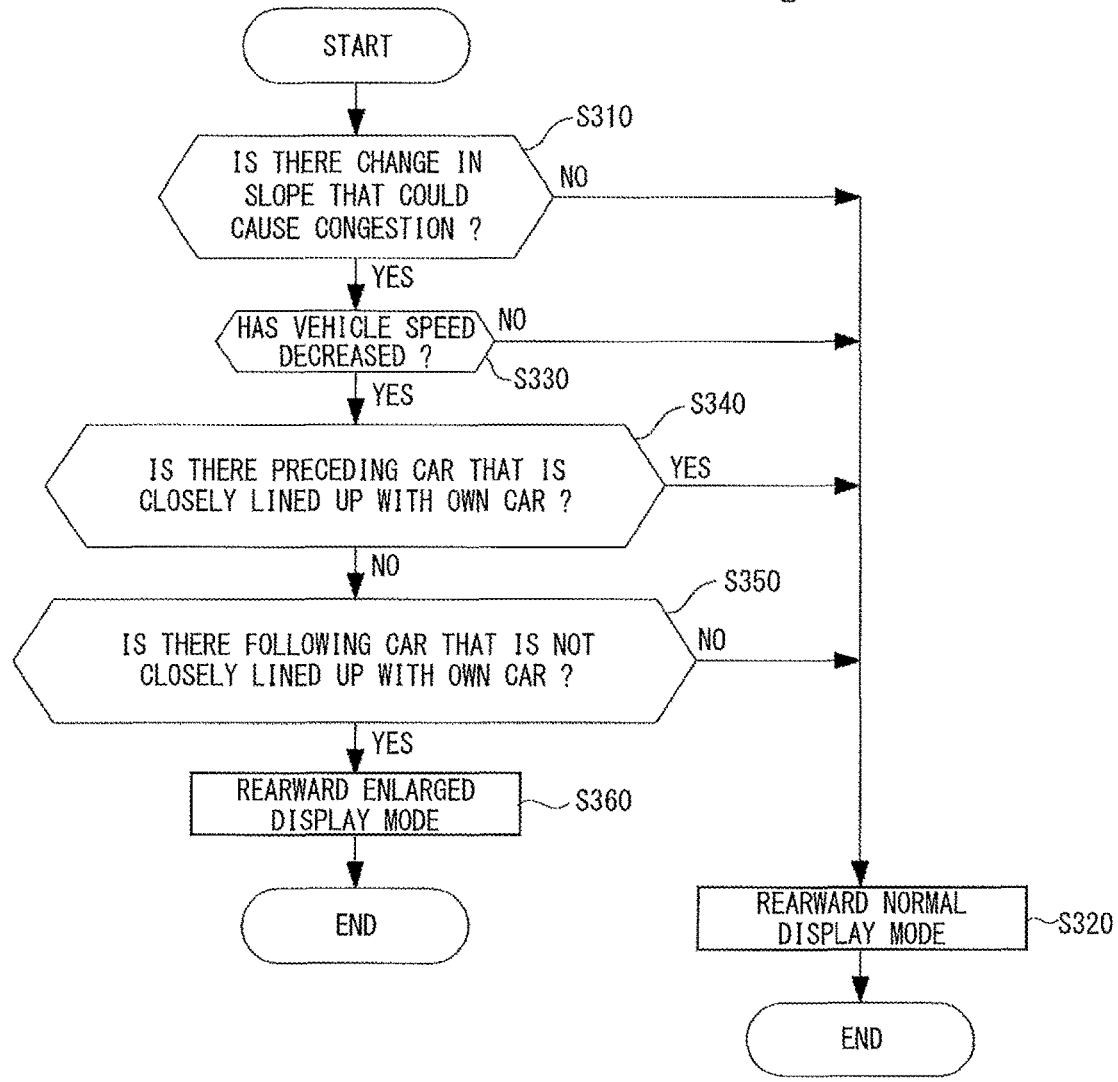
FIG. 6 is a flowchart showing an operation performed by a vehicle-use display device (first embodiment)

Next, an operation performed by the vehicle-use display device 9 is explained in detail with reference to FIG. 6.

Firstly, the display controller 20 determines whether there has been a change in a slope on a road on which the own car is traveling that could cause congestion based on road slope information acquired by the road slope information acquisition unit 16 (S310). The change in the slope that could cause congestion means an increase in an upward slope on the road on which the own car is traveling. Specifically, it may be a change by which a slope on the road on which the own car is traveling changes from a downward slope or a level state to an upward slope, or a change by which an upward slope on the road on which the own car is traveling becomes steeper. In the step S310, when the display controller 20 determines that there has been no change in the slope that could cause congestion (S310: NO), it performs or continues to perform the rearward normal display mode (S320) and finishes the process. In the step S310, when the display controller 20 determines that there has been a change in the slope that could cause congestion (S310: YES), it proceeds to a process in a step S330.

In the step S330, the display controller 20 determines whether a vehicle speed of the own car has decreased after the above-described change in the slope has occurred based on a vehicle speed acquired by the other-car detector 18 (S330). Here, "the decrease in the vehicle speed of the own car" means a decrease in the vehicle speed that is caused by an increase in the slope while the driver is driving the car at a constant speed, and is a decrease to such an extent that the driver does not become aware of the decrease. Therefore, it excludes sudden decreases in the vehicle speed and means a slow decrease in the vehicle speed of, for example, about 1 to 3 km/h per second. In the step S330, when the display controller 20 determines that the vehicle speed of the own car has not decreased after the above-described change in the slope has occurred (S330: No), it performs or continues the rearward normal display mode (S320) and finishes the process. In the step S330, when the display controller 20 determines that the vehicle speed of the own car has decreased after the above-described change in the slope has occurred (S330: YES), it proceeds to a process in a step S340.

In the step S340, the display controller 20 determines whether there is a preceding car that is closely lined up with the own car based on a detection result of the other-car detector 18 (S340). Here, "a preceding car closely lined up with the own car" means a preceding car located in a range that extends to a place a predetermined distance away from the current position of the own car in the forward direction. The predetermined distance means a distance by which cars closely that are lined up with each other in congestion are apart from each other. For example, in an expressway, the predetermined distance is about 20 m. In an ordinary road, the predetermined is about 10 m. Therefore, "there is no preceding car that is closely lined up with the own car" means that there is no preceding car located in a range that extends to a place the predetermined distance away from the current position of the own car in the forward direction. Therefore, it does not matter whether or not there is a preceding car in a place at least the predetermined distance away from the current position of the own car in the forward direction. In the step S340, when the display controller 20 determines that there is a preceding car closely lined up with the own car (S340: YES), it performs or continues the rearward normal display mode (S320) and finishes the process. This is because when there is a preceding car that is closely lined up with the own car, there is a possibility that congestion has already occurred or the preceding car, rather than the own car, is causing congestion. On the other hand, in the step S340, when the display controller 20 determines that there is no preceding car closely lined up with the own car (S340: NO), it proceeds to a process in a step S350.

In the step S350, the display controller 20 determines whether there is a following car that is not closely lined up with the own car based on a detection result of the other-car detector 18 (S350). Here, "there is no following car that is not closely lined up with the own car" means that there is no following car located in a range that extends to a place a predetermined distance away from the current position of the own car in the rearward direction and there is a following car in a place at least the predetermined distance away from the current position of the own car in the rearward direction. Similar to the previously-described predetermined distance, the predetermined distance means a distance by which cars that are closely lined up with each other in congestion are apart from each other. For example, in an expressway, the predetermined distance is about 20 m. In an ordinary road, the predetermined is about 10 m. In the step S350, when the display controller 20 determines that there is no following car that is not closely lined up with the own car (S350: NO), it performs or continues the rearward normal display mode (S320) and finishes the process. This is because when there is a following car within the range that extends to the place the predetermined distance away from the current position of the own car in the rearward direction, congestion has already occurred. Further, when there is no following car in a place at least the predetermined distance away from the current position of the own car in the rearward direction, the own car has not caused congestion. On the other hand, in the step S350, when the display controller 20 determines that there is a following car that is not closely lined up with the own car (S350: YES), it proceeds to a process in a step S360.

In the step S360, the display controller 20 performs the rearward enlarged display mode (S360). As described above, when the own car is about to become a cause of congestion, the display controller 20 performs the rearward enlarged display mode. Further, if not so, the display controller 20 performs the rearward normal display mode. In this way, when the own car is about to become a cause of congestion, a following car is reflected in the inner rearview mirror with the display function 7 in a larger size than it is reflected in the rearward normal display mode, thus making it possible to make the driver notice that the own car is about to become a cause of congestion. As a result, the user appropriately manipulates an accelerator and hence the occurrence of configuration is prevented.

The first embodiment is explained above. The above-described first embodiment is characterized as follows.

That is, the vehicle-use display device 9 includes a road slope information acquisition unit 16 configured to acquire a slope of a road on which an own car is traveling, a vehicle speed acquisition unit 17 configured to acquire a vehicle speed of the own car, an other-car detector 18 configured to detect a preceding car and a following car, an image pickup unit 24 configured to take an image of the view to the rear of the own car, a display unit 12, and a display controller 20 configured to display a rearward image taken by the image pickup unit 24 in the display unit 12. The display controller 20 is able to selectively perform a rearward normal display mode in which a first view-angle image 26 is displayed in the display unit 12 as an image of a first area of the rearward image 25 and a rearward enlarged display mode in which a second view-angle image 27 is displayed in the display unit 12 as an image of a second area of the rearward image 25 smaller than the first view-angle image 26 in an enlarged manner. The display controller 20 performs the rearward enlarged display mode when: it is detected that the vehicle speed of the own car has decreased (S330: YES) after an upward slope of the road on which the own car is traveling has increased (S310: YES); there is no preceding car that is closely lined up with the own car (S340: NO); and there is a following car that is not closely lined up with the own car (S350: YES). By the above-described configuration, when the own car is about to become a cause of congestion, the following car is reflected in the display unit 12 in a larger size than it is reflected in the rearward normal display mode, thus making it possible to make the driver notice that the own car is about to becomes a cause of congestion. As a result, the user appropriately manipulates an accelerator and hence the occurrence of configuration is prevented.

Further, the other-car detector 18 is configured to be able to detect a distance between the own car and a preceding car, and a distance between the own car and a following car. When the other-car detector 18 does not detect a preceding car or when the other-car detector 18 has detected a preceding car but a distance between the preceding car detected by the other-car detector 18 and the own car is equal to or longer than a predetermined distance, the display controller 20 determines that there is no preceding car that is closely lined up with the own car (S340: NO). When the other-car detector 18 has detected a following car and a distance between the following car detected by the other-car detector 18 and the own car is equal to or longer than a predetermined distance, the display controller 20 determines that there is a following car that is not closely lined up with the own car (S350: YES).

A display method for a vehicle is a method for selectively performing a rearward normal display mode in which a first view-angle image 26 of a rearward image 25 obtained by taking an image of the view to the rear of an own car is displayed in the display unit 12 and a rearward enlarged display mode in which a second view-angle image 27 of the rearward image 25 is displayed in the displayed unit 12 in an enlarged manner. The display method for a vehicle is performed as follows. That is, the rearward enlarged display mode is performed when: an upward slope of a road on which an own car is traveling has increased (S310: YES); a decrease in a vehicle speed of the own car is detected after the upward slope of the road has increased (S330: YES); there is no preceding car that is closely lined up with the own car (S340: NO); and there is a following car that is not closely lined up with the own car (S350: YES). By the above-described method, when the own car is about to become a cause of congestion, the following car is reflected in the display unit 12 in a larger size than it is reflected in the rearward normal display mode, thus making it possible to make the driver notice that the own car is about to becomes a cause of congestion. As a result, the user appropriately manipulates an accelerator and hence the occurrence of configuration is prevented.

Further, when no preceding car is detected or when a preceding car is detected but a distance between the detected preceding car and the own car is equal to or longer than a predetermined distance, it is determined that there is no preceding car that is closely lined up with the own car (S340: NO). When a following car is detected and a distance between the detected following car and the own car is equal to or longer than a predetermined distance, it is determined that there is a following car that is not closely lined up with the own car (S350: YES).

In the above-described first embodiment, it is possible, when an own car is traveling a road in which there is a possibility of an occurrence of congestion due to an upward slope, to make a user notice a possibility that the own car could become a cause of congestion because of a decrease in a vehicle speed due to the upward slope and hence to prevent the occurrence of congestion.

Second Embodiment

Figure 7:
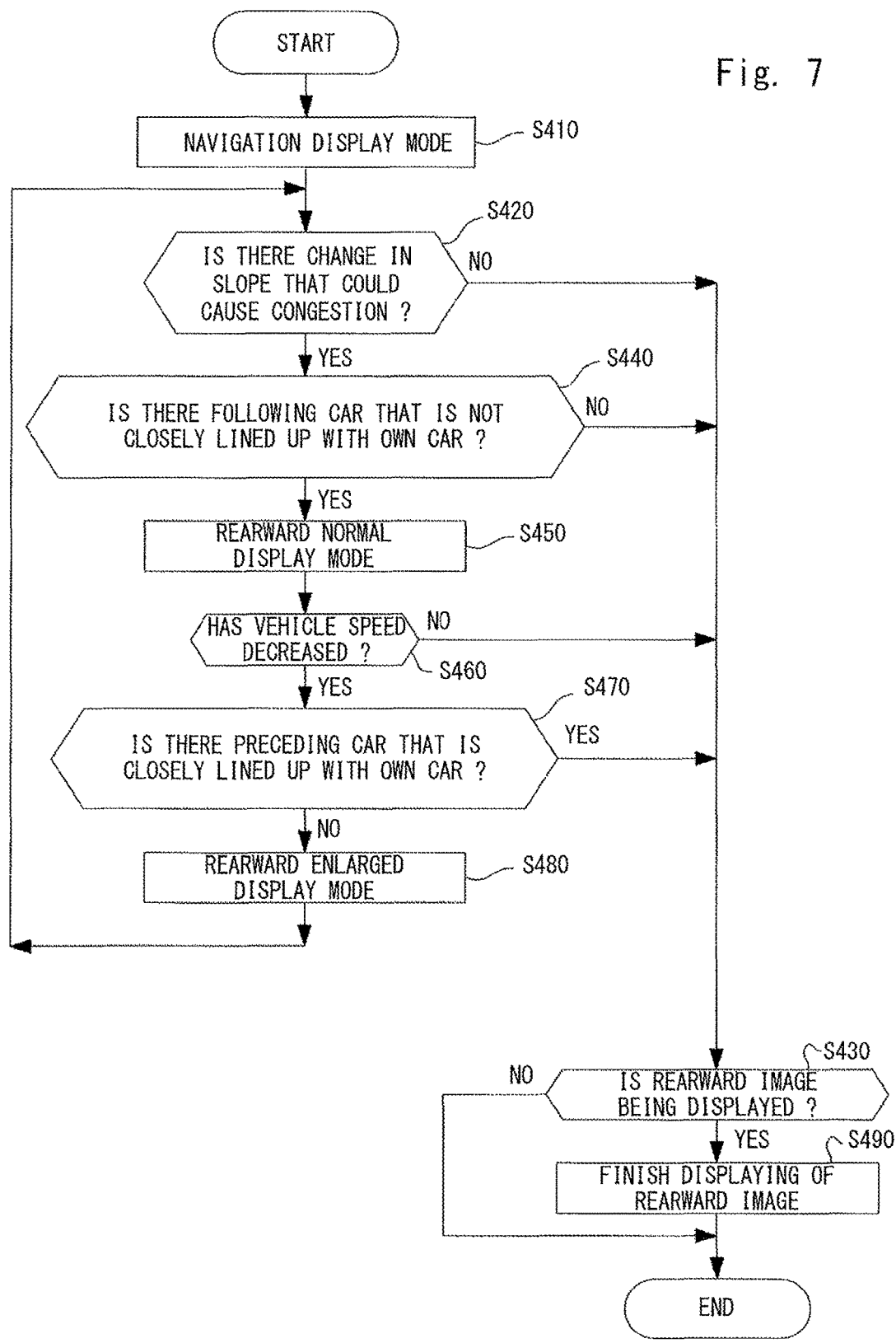
FIG. 7 is a flowchart showing an operation performed by a vehicle-use display device (second embodiment)

Next, a second embodiment is explained with reference to FIG. 7. Differences between this embodiment and the first embodiment are explained hereinafter and duplicated explanations are omitted.

In the above-described first embodiment, the inner rearview mirror with the display function 7 corresponds to the display unit 12. In contrast to this, the navigation display 6 corresponds to the display unit 12 in this embodiment.

Further, the display controller 20 is configured to be able to selectively perform a navigation display mode in addition to the rearward normal display mode and the rearward enlarged display mode. When the display controller 20 performs the navigation display mode, it displays a navigation image for guiding the own car in the navigation display 6.

Next, an operation performed by the vehicle-use display device 9 is explained in detail with reference to FIG. 7.

Firstly, the display controller 20 performs a navigation display mode (S410).

Next, the display controller 20 determines whether there has been a change in a slope on a road on which the own car is traveling that could cause congestion based on road slope information acquired by the road slope information acquisition unit 16 (S420). In the step S420, when the display controller 20 determines that there has been no change in the slope that could cause congestion (S420: NO), it proceeds to a process in a step S430. In the step S420, when the display controller 20 determines that there has been a change in the slope that could cause congestion (S420: YES), it proceeds to a process in a step S440.

In the step S440, the display controller 20 determines whether there is a following car that is not closely lined up with the own car based on a detection result of the other-car detector 18 (S440). In the step S440, when the display controller 20 determines that there is no following car that is not closely lined up with the own car (S440: NO), it proceeds to a process in the step S430. On the other hand, in the step S440, when the display controller 20 determines that there is a following car that is not closely lined up with the own car (S440: YES), it proceeds to a process in a step S450.

In the step S450, the display controller 20 performs the rearward normal display mode (S450) and proceeds to a process in a step S460.

In the step S460, the display controller 20 determines whether a vehicle speed of the own car has decreased after the above-described change in the slope has occurred based on a vehicle speed acquired by the other-car detector 18 (S460). In the step S460, when the display controller 20 determines that the vehicle speed of the own car has not decreased after the above-described change in the slope has occurred (S460: No), it proceeds to a process in the step S430.

In the step S460, when the display controller 20 determines that the vehicle speed of the own car has decreased after the above-described change in the slope has occurred (S460: YES), it proceeds to a process in a step S470.

In the step S470, the display controller 20 determines whether there is a preceding car that is closely lined up with the own car based on a detection result of the other-car detector 18 (S470). In the step S470, when the display controller 20 determines that there is a preceding car that is closely lined up with the own car (S470: YES), it proceeds to a process in the step S430. On the other hand, in the step S470, when the display controller 20 determines that there is no preceding car closely lined up with the own car (S470: NO), it proceeds to a process in a step S480.

In the step S480, the display controller 20 performs the rearward enlarged display mode (S480) and returns to the process in the step S420.

As described above, even in a normal state in which an image other than the rearward image is displayed, such as when the navigation display mode is being performed, when there is a possibility that the own car could become a cause of congestion, the vehicle-use display device 9 performs the rearward normal display mode as early as possible (S450). Further, when it is more obvious that the own car is about to become a cause of congestion, the vehicle-use display device 9 performs the rearward enlarged display mode (S480). In this way, it is possible to appropriately perform both of guiding the own car by using the navigation display 6 and prevention of congestion by using the navigation display 6. Further, it is possible to appropriately adjust the level of prevention of congestion.

In the step S430, the display controller 20 determines whether a rearward image is being displayed in the navigation display 6 (S430). That is, the display controller 20 determines whether it is performing the rearward normal display mode or the rearward enlarged display mode (S430). In the step S430, when a rearward image is being displayed in the navigation display 6 (S430: YES), the display controller 20 terminates the displaying of the rearward image in the navigation display 6 (S490) and finishes the process. On the other hand, in the step S430, when a rearward image is not being displayed in the navigation display 6 (S430: NO), the display controller 20 finishes the process.

The cluster panel 3 or the head-up display 8 may be used in place of the navigation display 6 as the display unit 12.

Third Embodiment

Next, a third embodiment is explained with reference to FIG. 8. Differences between this embodiment and the first embodiment are explained hereinafter and duplicated explanations are omitted.

Figure 8:
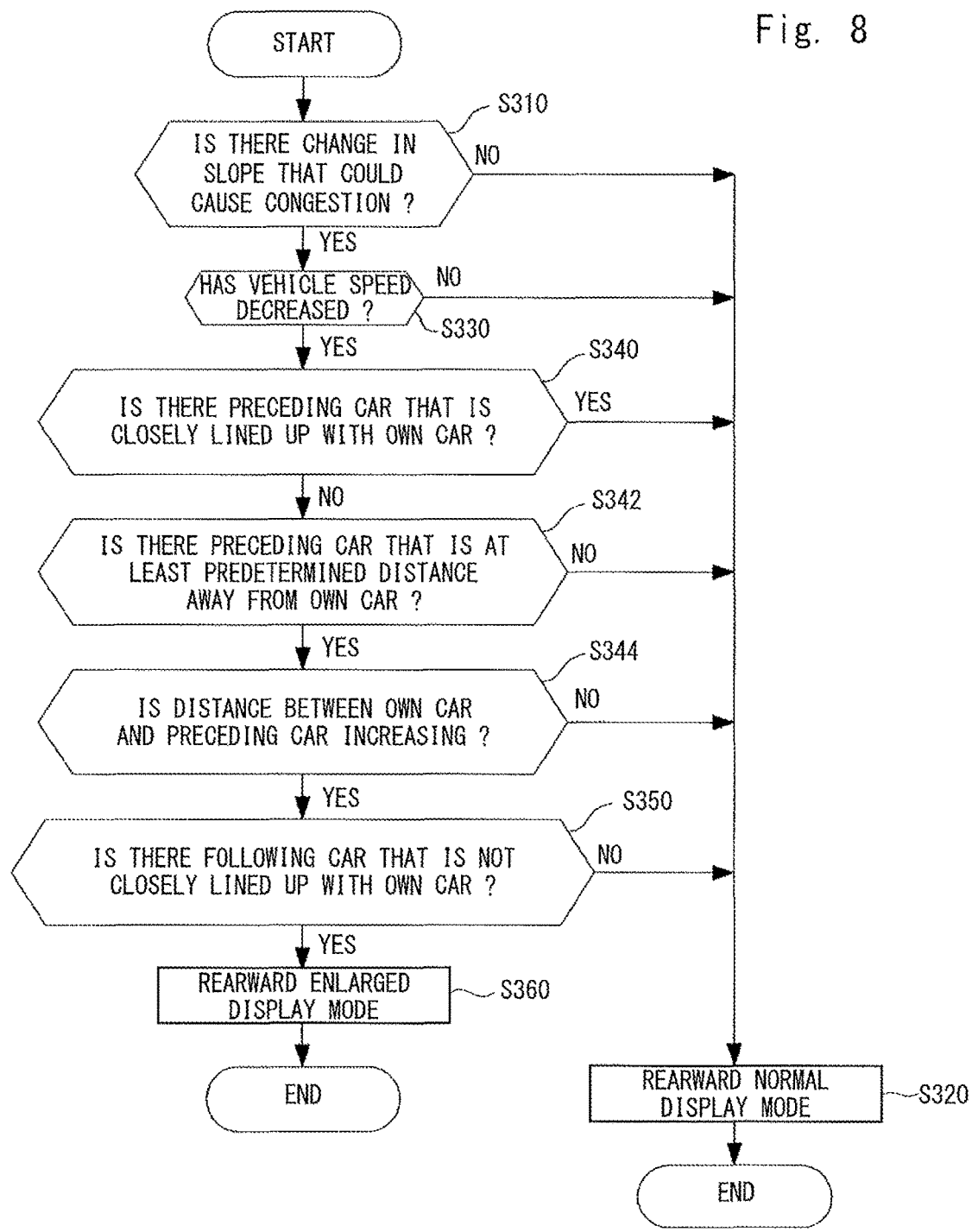
FIG. 8 is a flowchart showing an operation performed by a vehicle-use display device (third embodiment)

As shown in FIG. 8, in this embodiment, in the step S340, when the display controller 20 determines that there is no preceding car that is closely lined up with the own car (S340: NO), it proceeds to a process in a step S342.

In the step S342, the display controller 20 determines whether there is a preceding car that is at least a predetermined distance away from the own car based on a detection result of the other-car detector 18 (S342). Here, "a preceding car at least a predetermined distance away from the own car" means a preceding car that is not closely lined up with the own car. When the display controller 20 determines that there is no preceding car that is at least the predetermined distance away from the own car (S342: NO), it proceeds to a process in the step S320. On the other hand, when the display controller 20 determines that there is a preceding car that is at least the predetermined distance away from the own car (S342: YES), it proceeds to a process in a step S344.

In the step S344, the display controller 20 determines whether a distance between the aforementioned preceding car at least the predetermined distance away from the own car and the own car has increased (S344). When the display controller 20 determines that the distance between the aforementioned preceding car at least the predetermined distance away from the own car and the own car has increased (S344: YES), it proceeds to a process in a step S350. On the other hand, when the display controller 20 determines that the distance between the aforementioned preceding car at least the predetermined distance away from the own car and the own car has not increased (S344: NO), it proceeds to a process in the step S320.

As described above, in this embodiment, in the vehicle-use display device 9, the other-car detector 18 detects a preceding car (S342: YES). Further, when a distance between the aforementioned preceding car detected by the other-car detector 18 and the own car increases (S344: YES), the vehicle-use display device 9 performs the rearward enlarged display mode. Therefore, it is possible to determine, based on an increase in a distance between the own car and a preceding car that has been traveling with an appropriate distance from the own car with which the preceding car has not been closely lined up with the own car, whether a vehicle speed of the own car has obviously decreased compared to the preceding car or a group of preceding cars due to an increase in an upward slope and hence the own car is causing congestion. Making a driver notice that his/her car is causing congestion under the above-described condition is more effective to curb occurrences of congestion.

Fourth Embodiment

Next, a fourth embodiment is explained with reference to FIG. 9. Differences between this embodiment and the second embodiment are explained hereinafter and duplicated explanations are omitted.

Figure 9:
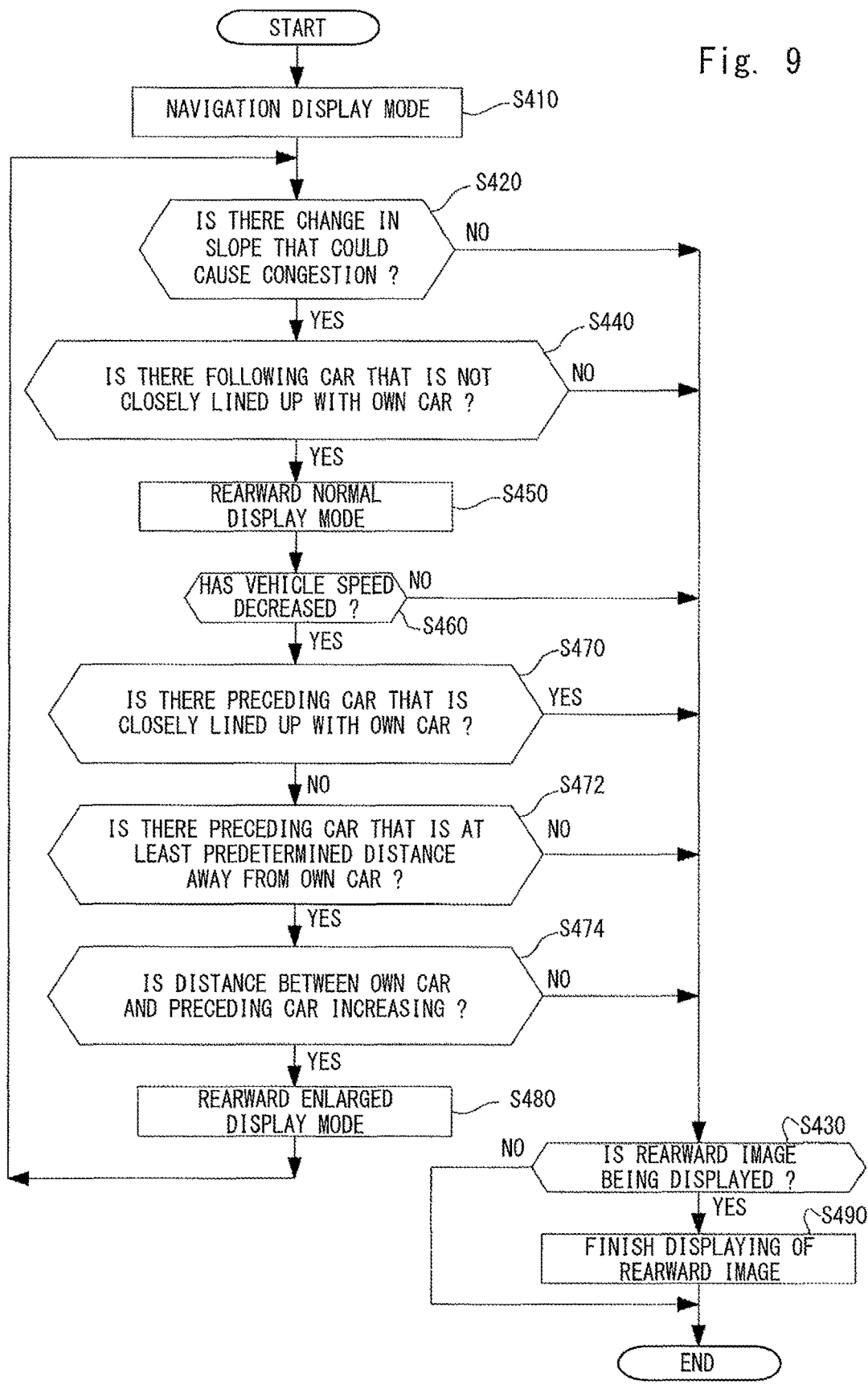
FIG. 9 is a flowchart showing an operation performed by a vehicle-use display device (fourth embodiment)

As shown in FIG. 9, in this embodiment, in the step S470, when the display controller 20 determines that there is no preceding car that is closely lined up with the own car (S470: NO), it proceeds to a process in a step S472.

In the step S472, the display controller 20 determines whether there is a preceding car that is at least a predetermined distance away from the own car based on a detection result of the other-car detector 18 (S472). Here, "a preceding car at least a predetermined distance away from the own car" means a preceding car that is not closely lined up with the own car. When the display controller 20 determines that there is no preceding car that is at least the predetermined distance away from the own car (S472: NO), it proceeds to a process in the step S430. On the other hand, when the display controller 20 determines that there is a preceding car that is at least the predetermined distance away from the own car (S472: YES), it proceeds to a process in a step S474.

In the step S474, the display controller 20 determines whether a distance between the aforementioned preceding car at least the predetermined distance away from the own car and the own car has increased (S474). When the display controller 20 determines that the distance between the aforementioned preceding car at least the predetermined distance away from the own car and the own car has increased (S474: YES), it proceeds to a process in a step S480. On the other hand, when the display controller 20 determines that the distance between the aforementioned preceding car at least the predetermined distance away from the own car and the own car has not increased (S474: NO), it proceeds to a process in the step S430.

As described above, in this embodiment, in the vehicle-use display device 9, the other-car detector 18 detects a preceding car (S472: YES). Further, when a distance between the aforementioned preceding car detected by the other-car detector 18 and the own car increases (S474: YES), the vehicle-use display device 9 performs the rearward enlarged display mode. Therefore, it is possible to determine, based on an increase in a distance between the own car and a preceding vehicle that have been traveling with an appropriate distance from the own car with which the preceding vehicle has not been closely lined up with the own car, whether a vehicle speed of the own car has obviously decreased compared to the preceding vehicle or a group of preceding vehicles due to an increase in an upward slope and hence the own car is causing congestion. Even in a state in which an image other than the rearward image is displayed, making a driver notice that his/her car is causing congestion under the above-described condition is more effective to curb occurrences of congestion.

Fifth Embodiment

Next, a fifth embodiment is explained with reference to FIG. 10. Differences between this embodiment and the first embodiment are explained hereinafter and duplicated explanations are omitted.

Figure 10:
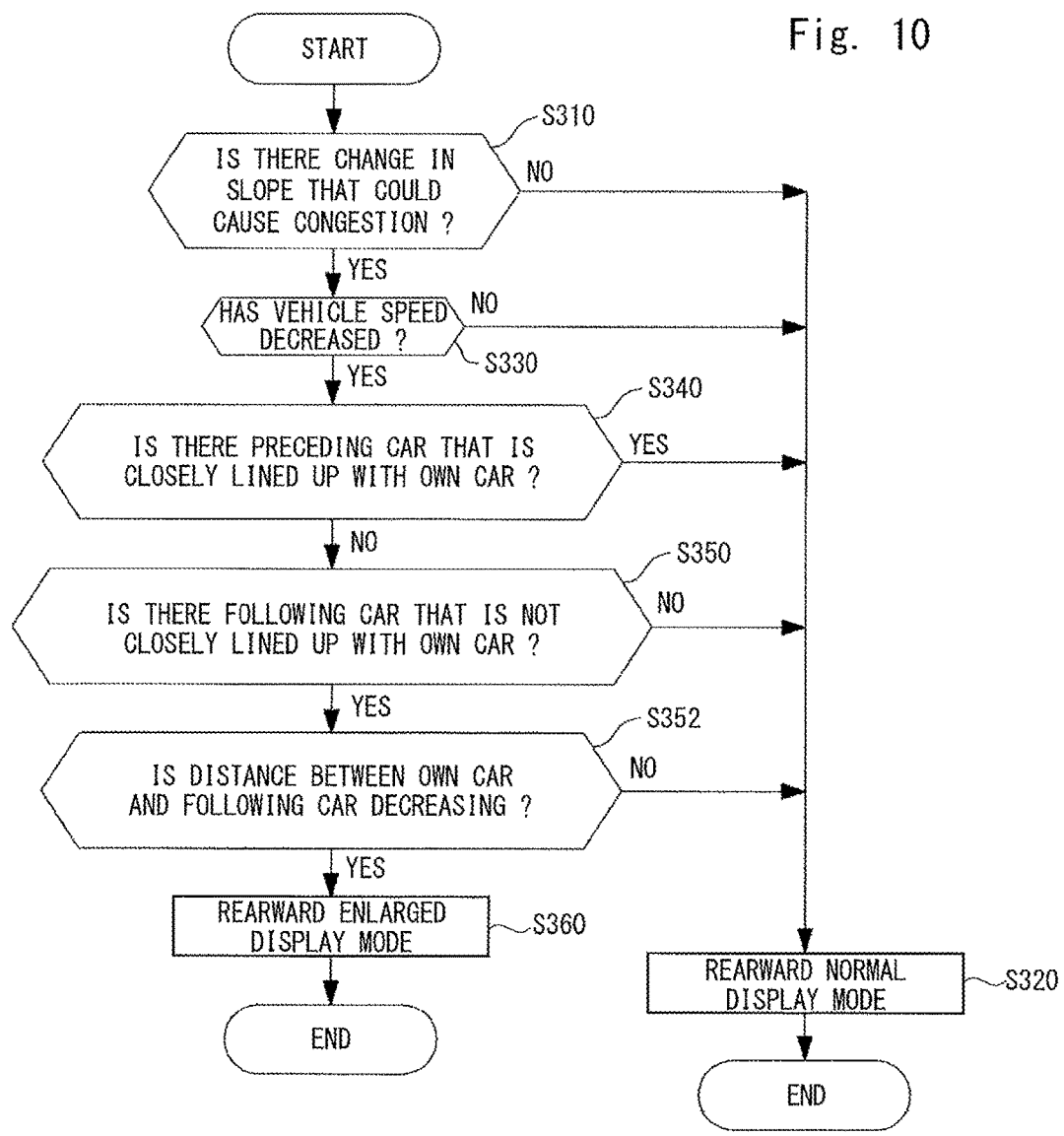
FIG. 10 is a flowchart showing an operation performed by a vehicle-use display device (fifth embodiment)

As shown in FIG. 10, in this embodiment, in the step S350, when the display controller 20 determines that there is a following car that is not closely lined up with the own car (S350: YES), it proceeds to a process in a step S352.

In the step S352, the display controller 20 determines whether a distance between the aforementioned following car and the own car has decreased (S352). When the display controller 20 determines that the distance between the aforementioned following car and the own car has decreased (S352: YES), it proceeds to a process in a step S360. On the other hand, in the above-described step S352, when the display controller 20 determines that the distance between the aforementioned following car and the own car has not decreased (S352: NO), it proceeds to a process in the step S320.

As described above, in this embodiment, in the vehicle-use display device 9, the other-car detector 18 detects a following car. Further, when a distance between the following car detected by the other-car detector 18 and the own car decreases (S352: YES), the vehicle-use display device 9 performs the rearward enlarged display mode. Therefore, it is possible to determine, based on a decrease in a distance between the own car and a following car that has been traveling with an appropriate distance from the own car with which the following car has not been closely lined up with the own car, whether a vehicle speed of the own car has obviously decreased compared to the following car or a group of following cars due to an increase in an upward slope and hence the own car is causing congestion. Making a driver notice that his/her car is causing congestion under the above-described condition is more effective to curb occurrences of congestion. However, when the distance between the following car and the own car is rapidly decreasing, such as when the distance is decreasing at 5 m per second or higher, in the determination of the step S352, the normal display mode may be performed or continued. This is because the aforementioned example of the decrease in the distance between cars at the rate of 5 m per second means that a relative difference between the speeds of the following car and the own car is 18 km/h. When the distance between cars is rapidly decreasing with such a speed difference, it is important to appropriately recognize the sense of distance between the own car and the following car.

Sixth Embodiment

Next, a sixth embodiment is explained with reference to FIG. 11. Differences between this embodiment and the second embodiment are explained hereinafter and duplicated explanations are omitted.

Figure 11:
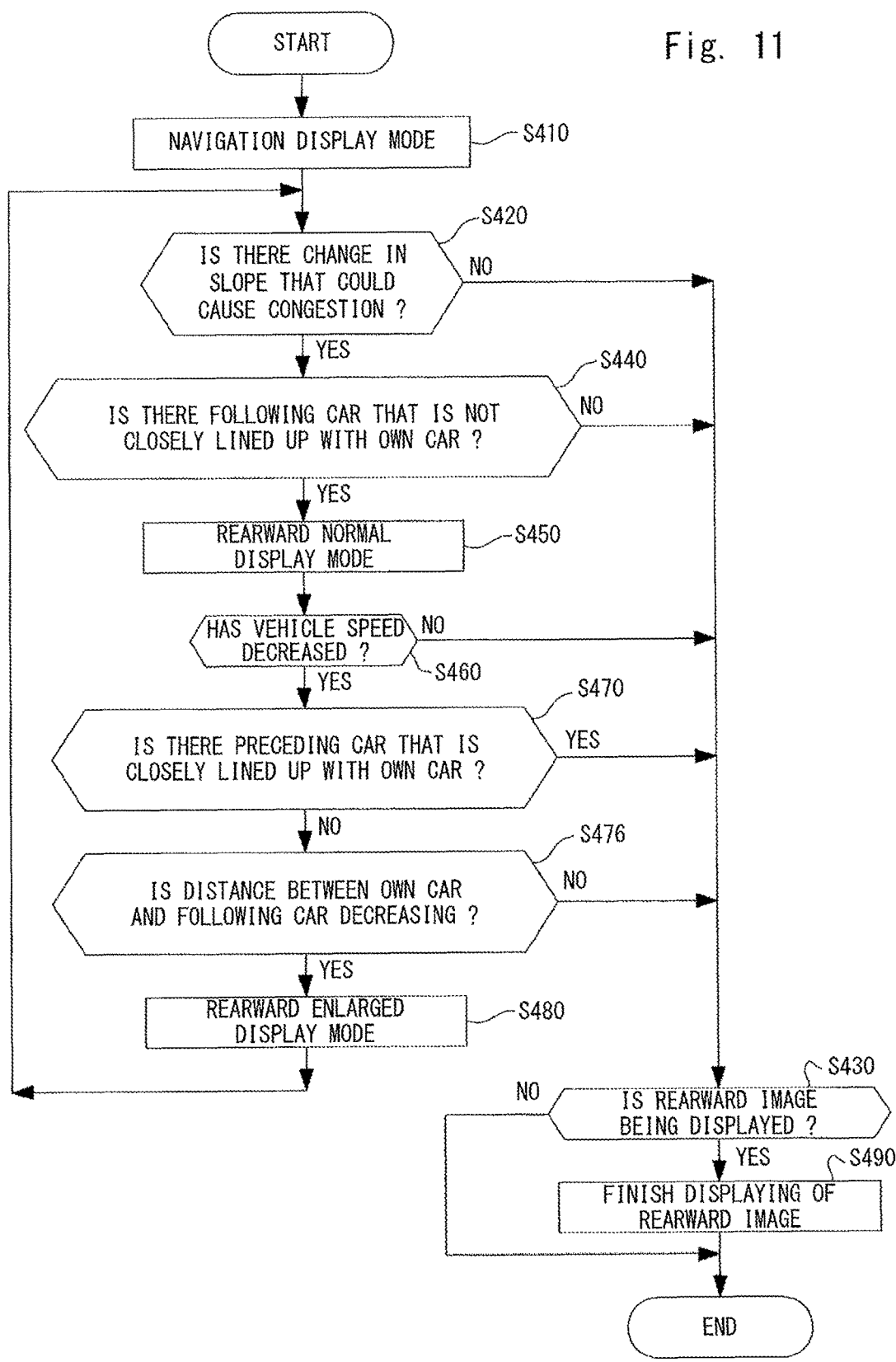
FIG. 11 is a flowchart showing an operation performed by a vehicle-use display device (sixth embodiment)

As shown in FIG. 11, in this embodiment, in the step S470, when the display controller 20 determines that there is no preceding car that is closely lined up with the own car (S470: NO), it proceeds to a process in a step S476.

In the step S476, the display controller 20 determines whether a distance between a following car that is not closely lined up with the own car (S440) and the own car has decreased (S476). When the display controller 20 determines that the distance between the aforementioned following car and the own car has decreased (S476: YES), it proceeds to a process in a step S480. On the other hand, in the above-described step S476, when the display controller 20 determines that the distance between the aforementioned following car and the own car has not decreased (S476: NO), it proceeds to a process in the step S430.

As described above, in this embodiment, in the vehicle-use display device 9, the other-car detector 18 detects a following car (S440). Further, when a distance between the following car detected by the other-car detector 18 and the own car decreases (S476: YES), the vehicle-use display device 9 performs the rearward enlarged display mode. Therefore, it is possible to determine, based on a decrease in a distance between the own car and a following car that has been traveling with an appropriate distance from the own car with which the following car has not been closely lined up with the own car, whether a vehicle speed of the own car has obviously decreased compared to the following car or a group of following cars due to an increase in an upward slope and hence the own car is causing congestion. Even in a state in which an image other than the rearward image is displayed, making a driver notice that his/her car is causing congestion under the above-described condition is more effective to curb occurrences of congestion. However, when the distance between the following car and the own car is rapidly decreasing, such as when the distance is decreasing at 5 m per second or higher, in the determination of the step S476, the normal display mode may be performed or continued. This is because the aforementioned example of the decrease in the distance between cars at the rate of 5 m per second means that a relative difference between the speeds of the following car and the own car is 18 km/h. When the distance between cars is rapidly decreasing with such a speed difference, it is important to appropriately recognize the sense of distance between the own car and the following car.

Seventh Embodiment

Figure 12:
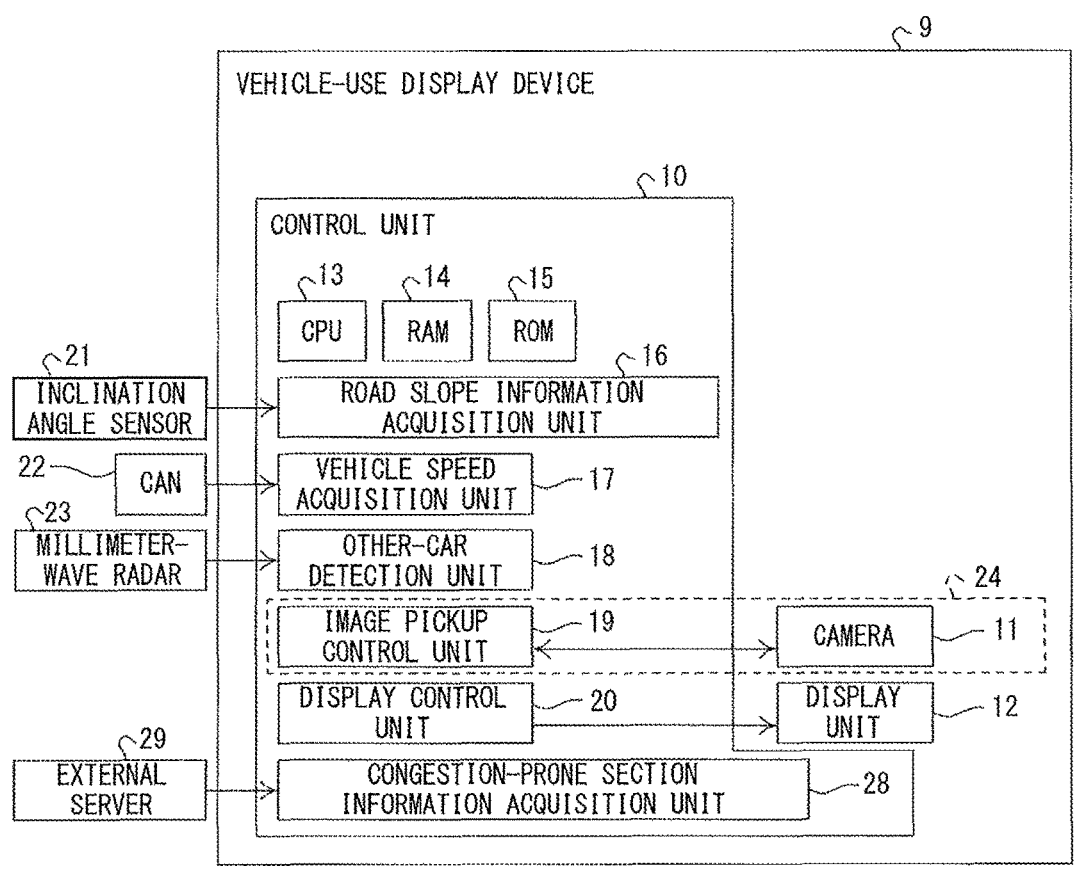
FIG. 12 is a functional block diagram of a vehicle-use display device (seventh embodiment)

Next, a seventh embodiment is explained with reference to FIGS. 12 and 13. Differences between this embodiment and the first embodiment are explained hereinafter and duplicated explanations are omitted.

In this embodiment, the vehicle-use display device 9 further includes a congestion-prone section information acquisition unit 28 that acquires congestion-prone section information which is known information specifying a congestion-prone section. The congestion-prone section information acquisition unit 28 acquires the congestion-prone section information from an external server 29 through radio communication such as a WAN (Wide Area Network). The congestion-prone section information acquisition unit 28 may use congestion-prone section information stored in a navigation system.

Next, an operation performed by the vehicle-use display device 9 is explained in detail with reference to FIG. 13.

Figure 13:
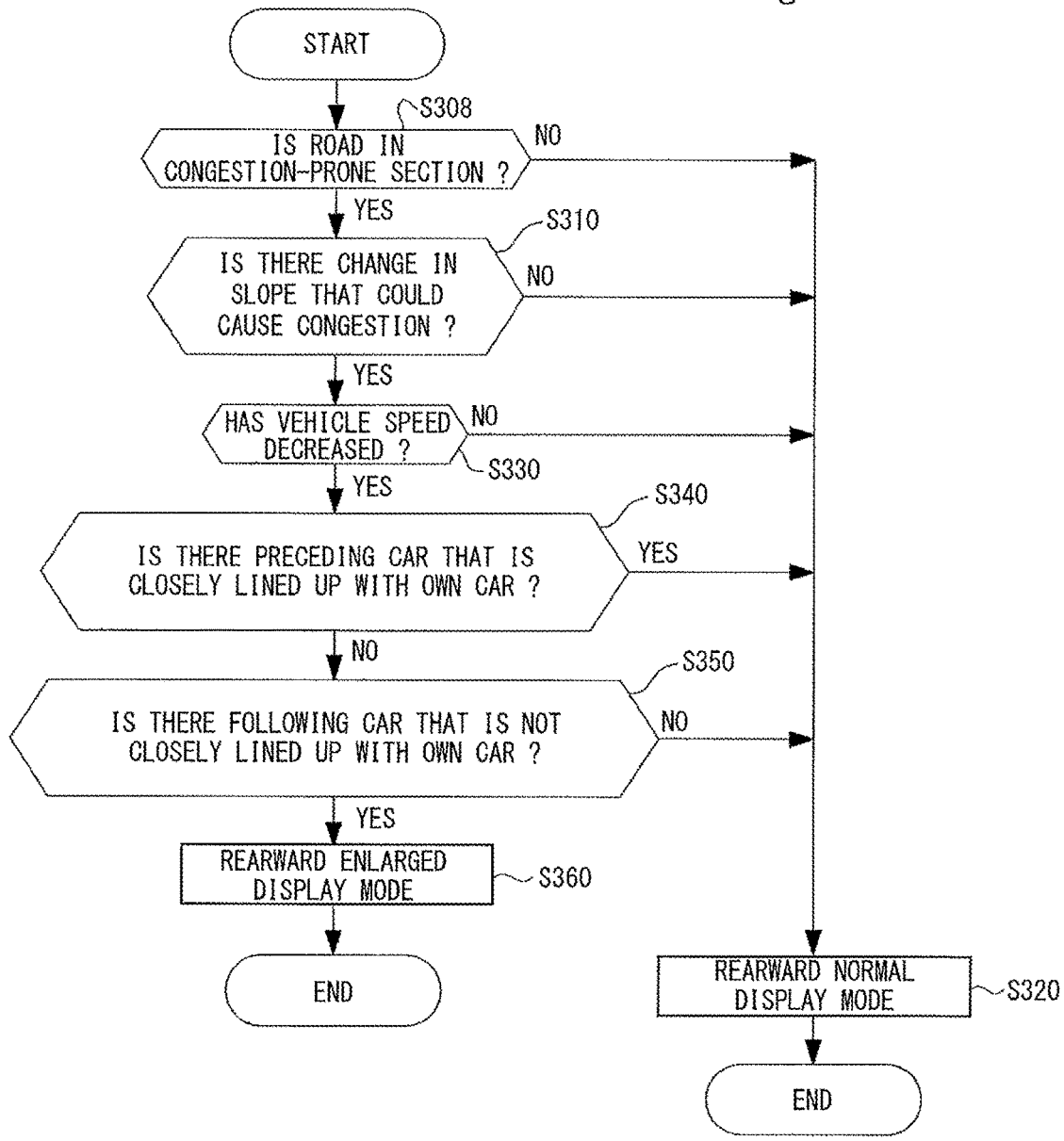
FIG. 13 is a flowchart showing an operation performed by a vehicle-use display device (seventh embodiment)

As shown in FIG. 13, in this embodiment, prior to determining whether there has been a change in a slope on a road on which the own car is traveling that could cause congestion based on road slope information acquired by the road slope information acquisition unit 16 (S310), the display controller 20 determines whether the road on which the own car is traveling is in a congestion-prone section based on congestion-prone section information acquired by the congestion-prone section information acquisition unit 28 (S308). Then, when the display controller 20 determines that the road on which the own car is traveling is in a congestion-prone section (S308: YES), it performs the rearward enlarged display mode. On the other hand, when the display controller 20 determines that the road on which the own car is traveling is not in a congestion-prone section (S308: NO), it proceeds to a process in the step S320.

As described above, in this embodiment, in the vehicle-use display device 9, when the display controller 20 determines that the road on which the own car is traveling is in a congestion-prone section (S308: YES), it performs the rearward enlarged display mode. Most of congestion-prone sections are sections in which congestion chronically occurs due to a change in a slope like the one determined in the step S310. Making a driver notice that his/her car is causing congestion under the above-described condition is more effective to curb occurrences of congestion.

Eighth Embodiment

Next, an eighth embodiment is explained with reference to FIG. 14. Differences between this embodiment and the first embodiment are explained hereinafter and duplicated explanations are omitted.

In this embodiment, the vehicle-use display device 9 further includes a congestion-prone section information acquisition unit 28 that acquires congestion-prone section information which is known information specifying a congestion-prone section. A configuration of the congestion-prone section information acquisition unit 28 is similar to that in the seventh embodiment shown in FIG. 12.

Next, an operation performed by the vehicle-use display device 9 is explained in detail with reference to FIG. 14.

Figure 14:
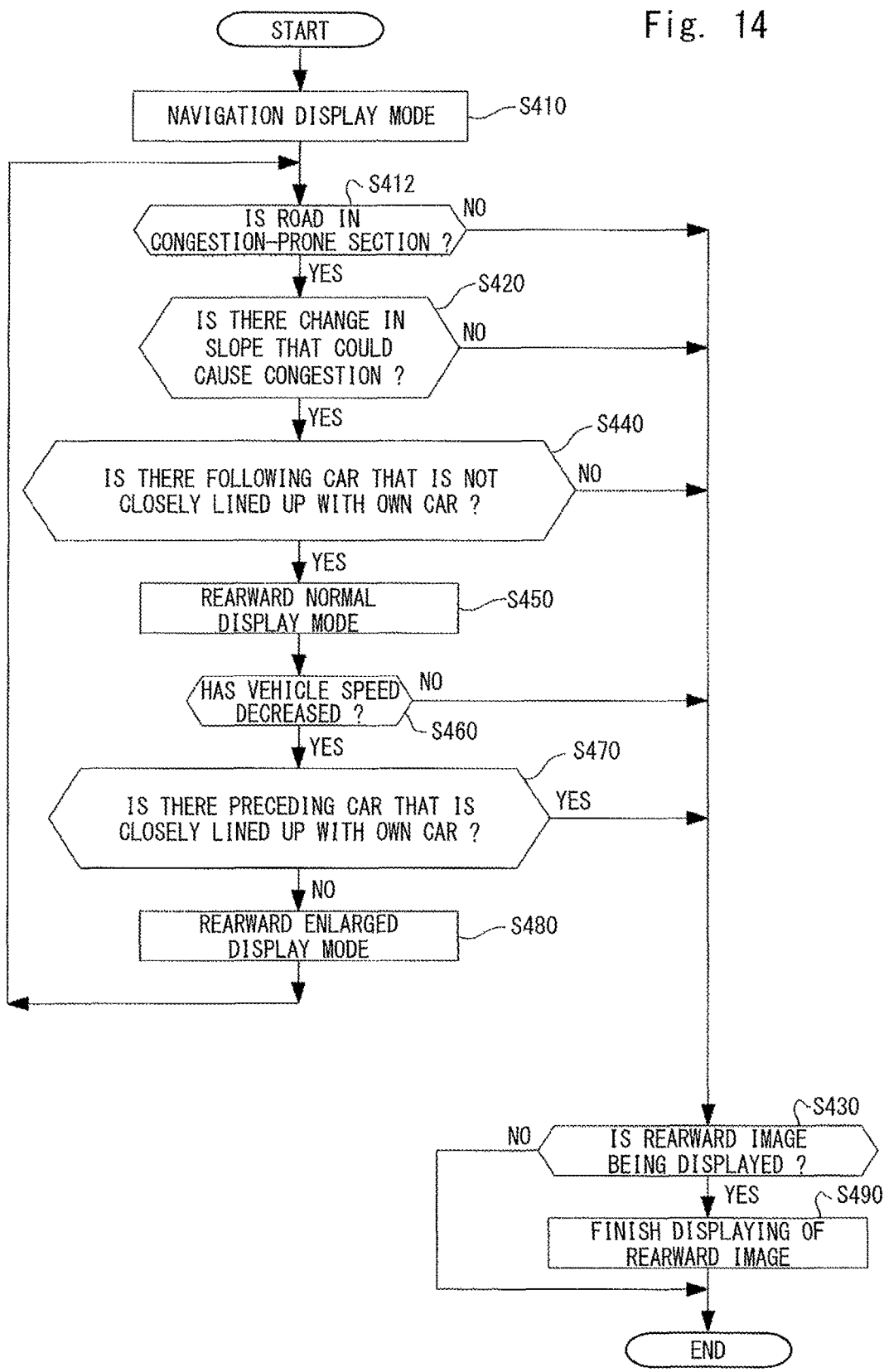
FIG. 14 is a flowchart showing an operation performed by a vehicle-use display device (eighth embodiment)

As shown in FIG. 14, in this embodiment, prior to determining whether there has been a change in a slope on a road on which the own car is traveling that could cause congestion based on road slope information acquired by the road slope information acquisition unit 16 (S420), the display controller 20 determines whether the road on which the own car is traveling is in a congestion-prone section based on congestion-prone section information acquired by the congestion-prone section information acquisition unit 28 (S412). Then, when the display controller 20 determines that the road on which the own car is traveling is in a congestion-prone section (S412: YES), it performs the rearward enlarged display mode. On the other hand, when the display controller 20 determines that the road on which the own car is traveling is not in a congestion-prone section (S412: NO), it proceeds to a process in the step S430.

As described above, in this embodiment, in the vehicle-use display device 9, when the display controller 20 determines that the road on which the own car is traveling is in a congestion-prone section (S412: YES), it performs the rearward enlarged display mode. Most of congestion-prone sections are sections in which congestion chronically occurs due to a change in a slope like the one determined in the step S310. Even in a state in which an image other than the rearward image is displayed, making a driver notice that his/her car is causing congestion under the above-described condition is more effective to curb occurrences of congestion.

The first to eight embodiments have been explained so far, but each of the above-described embodiments can be modified as follows.

That is, in each of the above-described embodiments, the rearward enlarged display mode is a mode in which the second view-angle image 27 is displayed in the display unit 12 in an enlarged manner. However, instead of this method, the rearward enlarged display mode may be a mode in which the first view-angle image 26 and the enlarged second view-angle image 27 are alternately displayed in the display unit 12.

Figure 15:
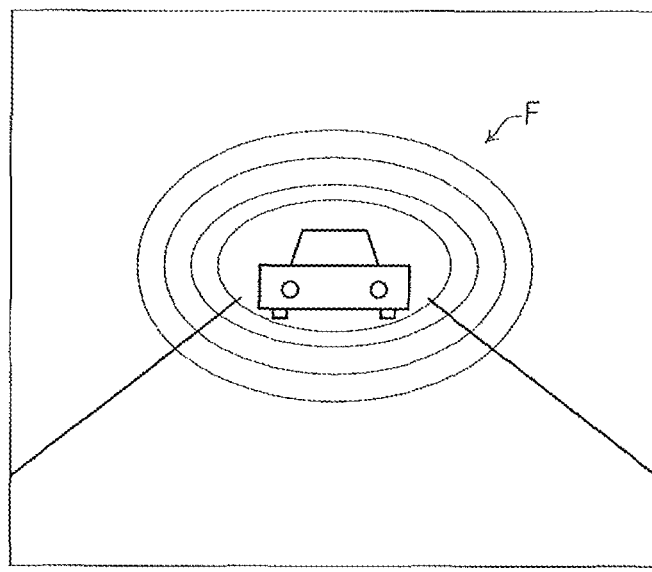
FIG. 15 schematically shows another example of a displayed image.

Further, as shown in FIG. 15, when the display controller 20 performs the rearward enlarged display mode, it may display the rearward image so that the presence of a following car F is emphasized in the display unit 12, such as displaying the background of the following car F in red color, in order to make the driver notice the presence of the following car more obviously.

Further, a traveling speed of the own car may be incorporated into the condition for performing the rearward enlarged display mode explained in each of the above-described embodiments. For example, in the determination on whether or not the vehicle speed of the own car has decreased (S330, S460), if the traveling speed at that moment is equal to or higher than a predetermined speed, such as if the traveling speed is equal to or higher than a legal speed for the road on which the own car is traveling, the rearward normal display mode may be performed or continued even when it is determined that the vehicle speed of the own car has decreased.

Ninth Embodiment

Next, a ninth embodiment is explained with reference to FIGS. 16 to 19. Differences between this embodiment and the first embodiment are explained hereinafter and duplicated explanations are omitted. This ninth embodiment relates to other examples of the rearward enlarged display mode and can be applied to any of the above-described other embodiments.

Figure 16:
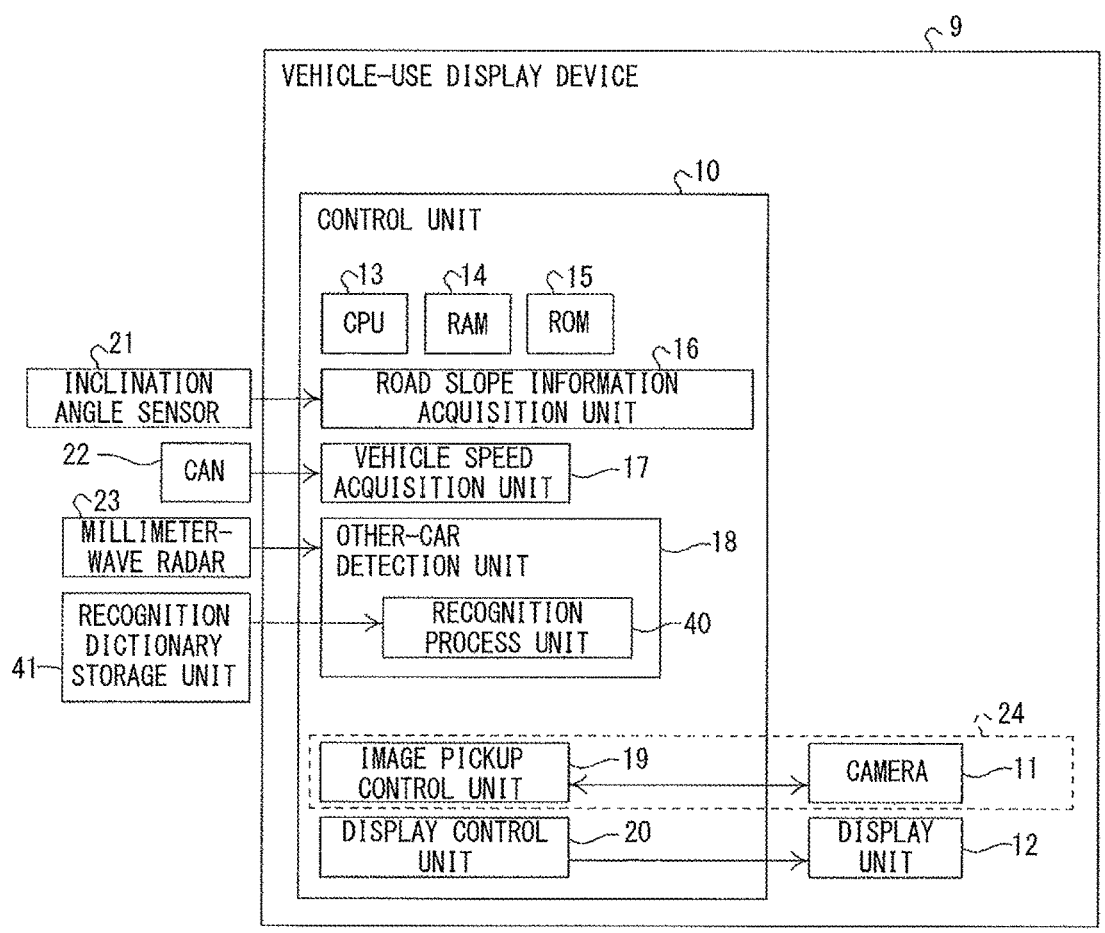
FIG. 16 is a functional block diagram of a vehicle-use display device (ninth embodiment)

FIG. 16 is a functional block diagram of a vehicle-use display device 9. As shown in FIG. 16, an other-car detector 18 according to this embodiment includes a recognition process unit 40, in addition to detecting a preceding car and a following car by using the millimeter-wave radar 23. The recognition process unit 40 recognizes a following car in a rearward image 25 taken by the image pickup unit 24 by referring to a recognition dictionary stored in a recognition dictionary storage unit 41. Note that the following car is not limited to four-wheel vehicles and may include two-wheel vehicles.

Specifically, the recognition process unit 40 performs pattern matching between shapes of edge-detected feature parts and those recorded in the recognition dictionary for each of specified frames or each frame of a rearward image 25 taken by the image pickup unit 24. The range in which the recognition process unit 40 detects other cars may be the whole range of the rearward image 25. However, the processing load is reduced by performing the detection only in the range of the first view-angle image 26 (see FIG. 3 too).

In contrast to this, similar to the other embodiments, the millimeter-wave radar 23 detects a distance between the own car and a following car. However, the detection of the distance between cars by using the millimeter-wave radar 23 may be performed only for a following car that is located directly behind the own can and is traveling in a lane in which the own car is traveling.

Figure 17:
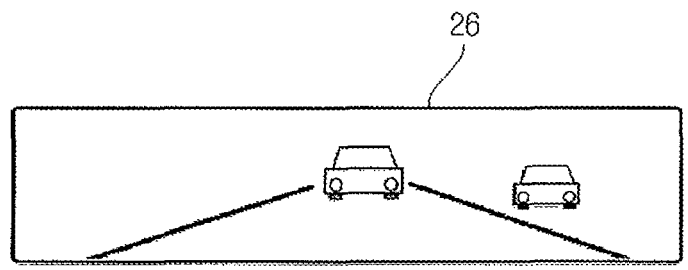
FIG. 17 schematically shows an example of an image displayed in an inner rearview mirror with a display function (ninth embodiment)

As shown in FIG. 17, when the other-car detector 18 equipped with the recognition process unit 40 detects a plurality of vehicles in the first view-angle image 26, it determines, for each of the vehicles, a positional relation between the own car and that vehicle based on the position and the size of the vehicle in the first view-angle image 26 and thereby recognizes that there are a following car in a lane in which the own car is traveling and another following car in a lane next to the lane in which the own car is traveling. Note that the recognition process unit 40 may perform a lane recognition process and thereby recognize the presence of a following car for each lane.

When a following car in the lane in which the own car is traveling and a following car in the lane next to the lane in which the own car is traveling are detected as cars following the own car and the rearward enlarged display mode is performed because a condition similar to that in the above-described other embodiments is satisfied, the display controller 20 sets the second area as follows. That is, the display controller 20 sets the second area so that the second area includes the following car in the lane in which the own car is traveling but does not include the following car in the lane next to the lane in which the own car is traveling.

Further, when the display controller 20 performs the rearward enlarged display mode, it superimposes the enlarged second view-angle image 27 on the first view-angle image 26 and displays the first view-angle image 26 with the second view-angle image 27 superimposed thereon in the display unit 12.

Figure 18:
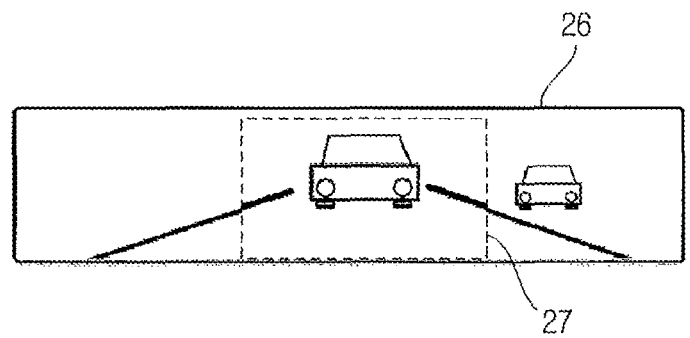
FIG. 18 schematically shows an example of an image displayed in an inner rearview mirror with a display function (ninth embodiment)
Figure 19:
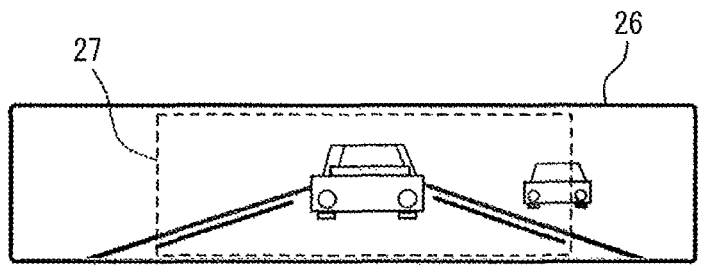
FIG. 19 schematically shows an example of an image displayed in an inner rearview mirror with a display function (ninth embodiment).

Note that as shown in FIG. 18, when the display controller 20 superimposes the enlarged second view-angle image 27 on the first view-angle image 26, it superimposes the enlarged second view-angle image 27 on the first view-angle image 26 in such a manner that the enlarged second view-angle image 27 does not overlap the following car in the lane next to the lane in which the own car is traveling in the first view-angle image 26. Alternatively, as shown in FIG. 19, when the display controller 20 performs the rearward enlarged display mode, it may superimpose the enlarged second view-angle image 27 on the first view-angle image 26 in a translucent manner and display the first view-angle image 26 with the second view-angle image 27 superimposed thereon in the display unit 12.

In the above-described first to eighth embodiments, it is possible to make a driver notice that his/her car is causing congestion. Note that when the own car is traveling in a passing lane, the driver may manipulate the car to return to a cruising lane. In such a case, according to this embodiment, the driver can appropriately check the presence of a following car in the next lane. Further, since the display state of the following car in the next lane is not changed, the sense of distance to the following car in the next lane does not change, thus enabling the driver to change the lane without problems.

The present disclosure can be applied to a display device for a vehicle and is industrially applicable.

According to an embodiment, it is possible to provide a technique for making a driver notice that his/her car could become a cause of congestion in order to curb an occurrence of congestion.

What is claimed is:
1. A vehicle-use display device comprising:
    a road slope information acquisition unit configured to acquire slope information of a road on which an own car is traveling;
    a vehicle speed acquisition unit configured to acquire a vehicle speed of the own car;
    an other-car detector configured to detect a car preceding the own car and a car following the own car;
    an image pickup unit configured to take an image of view to rear of the own car;
    a display unit; and
    a display controller configured to display a rearward image taken by the image pickup unit in the display unit; wherein
    the display controller is able to selectively perform a rearward normal display mode and a rearward enlarged display mode, the rearward normal display mode being a mode in which an image of a first area in the rearward image is displayed in the display unit, the rearward enlarged display mode being a mode in which an image of a second area in the rearward image smaller than the first area is displayed in the displayed unit in an enlarged manner, and
    the display controller performs the rearward enlarged display mode when:
    it is detected that an upward slope of the road on which the own car is traveling has increased based on the slope information acquired by the road slope information acquisition unit;
    it is detected that the vehicle speed of the own car has decreased after the upward slope of the road has increased based on the vehicle speed acquired by the vehicle speed acquisition unit;
    there is no preceding car that is closely lined up with the own car based on a result of detection by the other-car detector; and
    there is the following car that is not closely lined up with the own car.
2. The display device for a vehicle according to claim 1, wherein
    the other-car detector detects a distance between the own car and the preceding car, and a distance between the own car and the following car,
    the display controller determines that there is no preceding car that is closely lined up with the own car when the other-car detector detects no preceding car, or when the other-car detector detects the preceding car but the distance between the preceding car detected by the other-car detector and the own car is equal to or longer than a predetermined distance, and
    the display controller determines that there is the following car that is not closely lined up with the own car when the other-car detector detects the following car and the distance between the following car detected by the other-car detector and the own car is equal to or longer than a predetermined distance.

3. The display device for a vehicle according to claim 2, wherein the display controller performs the rearward enlarged display mode when the other-car detector detects the preceding car and the distance between the preceding car detected by the other-car detector and the own car increases.

4. The display device for a vehicle according to claim 2, wherein the display controller performs the rearward enlarged display mode when the other-car detector detects the following car and the distance between the following car detected by the other-car detector and the own car decreases.

5. The display device for a vehicle according to claim 1, wherein
the other-car detector detects a following car in a lane in which the own car is traveling and a following car in a lane next to the lane in which the own car is traveling as cars following the own car, and
when the following car in the lane next to the lane in which the own car is traveling is detected, the display controller defines an area including the following car in the lane in which the own car is traveling as the second area when the display controller performs the rearward enlarged display mode.

6. The display device for a vehicle according to claim 5, wherein
the display controller is configured to superimpose an enlarged image of the second area on an image of the first area and displays the image of the first area with the image of the second area superimposed thereon in the display unit when the display controller performs the rearward enlarged display mode, and
when the display controller superimposes the enlarged image of the second area on the image of the first area, the display controller superimposes the enlarged image of the second area on the image of the first area in such a manner that the enlarged image of the second area does not overlap the following car in the lane next to the lane in which the own car is traveling in the image of the first area.

7. The display device for a vehicle according to claim 5, wherein the display controller is configured to superimpose an enlarged image of the second area on an image of the first area in a translucent manner and displays the image of the first area with the image of the second area superimposed thereon in the display unit when the display controller performs the rearward enlarged display mode.

8. The display device for a vehicle according to claim 1, further comprising a congestion-prone section information acquisition unit configured to acquire congestion-prone section information specifying a congestion-prone section, wherein
when the display controller determines that a road on which the own car is travelling is in the congestion-prone section based on the congestion-prone section information, the display controller performs the rearward enlarged display mode.

9. The display device for a vehicle according to claim 1, wherein an image of the first area and an enlarged image of the second are alternately displayed in the rearward enlarged display mode.

10. A display method for a vehicle for selectively performing a rearward normal display mode and a rearward enlarged display mode, the rearward normal display mode being a mode in which an image of a first area in a rearward image obtained by taking an image of view to rear of an own car is displayed in the display unit, the rearward enlarged display mode being a mode in which an image of a second area in the rearward image smaller than the first area is displayed in the displayed unit in an enlarged manner, wherein
the rearward enlarged display mode is performed when:
an upward slope of a road on which the own car is traveling has increased;
a decrease in a vehicle speed of the own car is detected after the upward slope of the road has increased;
there is no preceding car that is closely lined up with the own car; and
there is a following car that is not closely lined up with the own car.

* * * * *